Nov. 25, 1969     A. CANTARUTTI     3,479,693
TIRE MOLD CONSTRUCTION
Filed Sept. 22, 1966
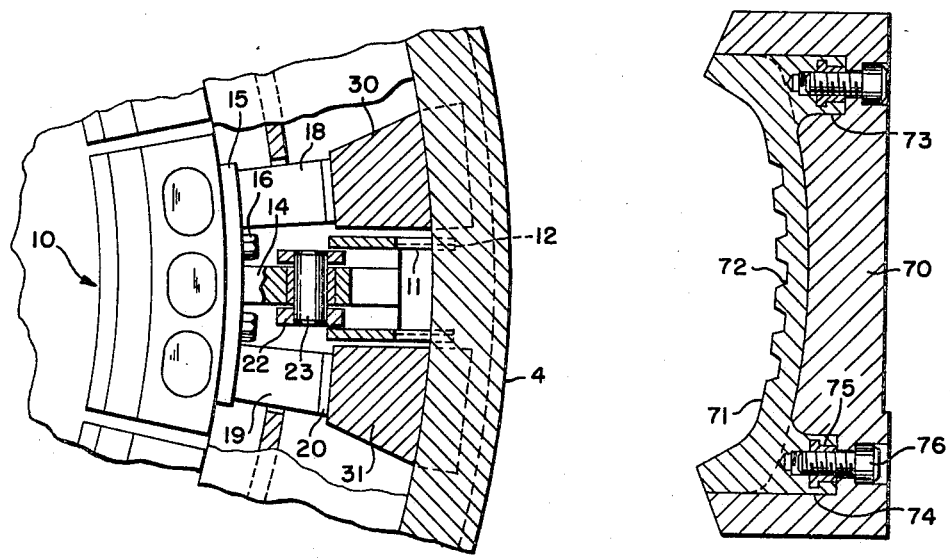
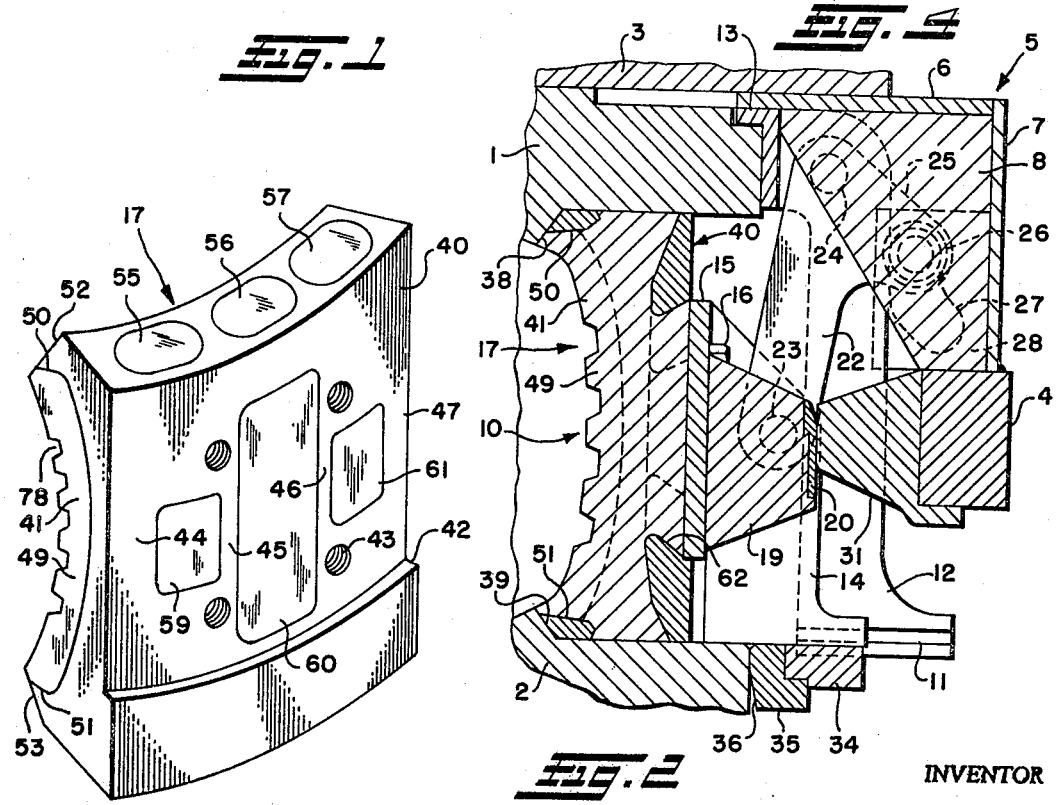
INVENTOR
ARMINDO CANTARUTTI
BY *Oberlin, Maky & Donnelly*
ATTORNEYS united States Patent Office 3,479,693
Patented Nov. 25, 1969

3,479,693
TIRE MOLD CONSTRUCTION
Armindo Cantarutti, Akron, Ohio, assignor, by mesne assignments, to NRM Corporation, a corporation of Ohio
Filed Sept. 22, 1966, Ser. No. 581,245
Int. Cl. B29h 5/02
U.S. Cl. 18—17                                    5 Claims

ABSTRACT OF THE DISCLOSURE

A tire mold construction for sectional mold tire presses using radially movable tread mold sectors between upper and lower side wall mold sections with each tread mold sector being of a composite metallic structure having a softer metal insert in a harder metal frame, the insert being cast within the frame with the latter having passages extending to the exterior thereof with the softer metal of the insert within the passages being coplanar with the frame to facilitate heat transfer to the tread pattern which is machined into the insert.

---

This invention relates generally as indicated to a tire mold construction and more particularly to a composite metal mold characterized by ease of fabrication and efficient heat transfer.

Conventional tire molds are very costly of manufacture and, of course, represent a substantial investment to the tire manufacturer. Tire molds have to be very accurately machined and this is a long and arduous task because of the complexity of the patterns to be produced therein and because of the hardness of the conventional steel utilized. In molds for producing conventional tires, upper and lower mold sections are mounted in a tire press, each including one-half of the tread portion of the mold. These annular tread portions include pilot surfaces which seat together as the press is closed, shaping and then curing the tire. In radial tire molds, the tread portion of the mold is segmentalized and a plurality of tread sectors move radially between upper and lower side wall mold sections to open and close the press. The interfitting and relatively moving mold parts usually preclude the employment of softer metals such as aluminum because of thermal instability and rapid wear even though such metals may be much more rapidly machined. Accordingly, tire molds having the easier machining and higher heat transfer characteristics of softer metals such as aluminum and the wear resistance, thermal stability and structural strength of steel would be highly desirable.

It is accordingly a principal object of the present invention to provide a tire mold construction having a combination of the optimum qualities of both hard and softer metals.

Another principal object is the provision of a composite metallic tire mold in which the tire pattern and particularly the tread pattern may be rapidly machined.

Another object is the provision of a composite metallic tire mold having an aluminum or like metallic insert for rapid machining of the tread pattern and a frame of steel providing the required structural strength necessary to withstand the squeeze of the tire press and to provide proper wear-resistant sliding surfaces.

A further object is the provision of a tire mold construction having an aluminum cast tread insert which is positively fastened to the steel supporting frame.

Yet another object is the provision of a tire mold construction wherein the patterns can more economically be changed.

A still further object is the provision of a tire mold construction having the above advantages and still providing improved heat transfer.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but one of a few of the various ways in which the principles of the invention may be employed.

In said annexed drawings:

FIG. 1 is a horizontal section of a sectional mold tire press utilizing a preferred tire mold construction in accordance with the present invention;

FIG. 2 is a fragmentary vertical section taken substantially on the line 2—2 of FIG. 1;

FIG. 3 is a perspective view of the tread mold sector seen in FIGS. 1 and 2; and FIG. 4 is a vertical section of another form of mold sector in accordance with the present invention.

Tire presses of the type illustrated in FIGS. 1 and 2 may be seen in greater detail in applicant's copending application, Ser. No. 399,543, entitled "Tire Curing Press," filed Sept. 28, 1964, abandoned in favor of continuation application Ser. No. 670,805, filed Sept. 26, 1967, and the copending application of Cantarutti et al., Ser. No. 564,829, filed July 13, 1966, entitled "Sectional Mold Mechanism."

The press mechanism includes a top annular side wall mold section 1 and an opposed bottom annular side wall mold section 2. The bottom mold section is mounted on the press base while the top mold section 1 is mounted on the press head for movement toward and away from the bottom mold section to open and close the press and in closing, to shape the tire. The top annular mold section 1 is supported for limited vertical movement with respect to bolster 3 secured to the press head. To the peripheral edge of the bolster is secured a ring 4 by framing 5 with the latter including horizontal annular plate 6, vertical skirt 7 and a plurality of gussets 8.

Tread mold sectors shown generally at 10 are mounted for horizontal sliding movement in guides 11 on brackets 12 which are secured to angle 13 mounted on the outer edge of the upper side wall mold section 1. The guides or slots 11 on the brackets 12 interfit with lateral projections on vertical rib 14 projecting rearwardly from sector mounting plate 15 which is secured by suitable fasteners 16 to the sector body shown generally at 17.

On each side of the rearwardly projecting rib 14 there are provided bearing blocks 18 and 19, the outer edges of which are provided with wear plates 20, the upper edges of which are piloted or beveled.

Radial movement of the sectors 10 is obtained by respective bell cranks 22. The bell cranks each comprise laterally spaced levers straddling and pivoted by means of the pin and bushing construction 23 to the rearwardly projecting rib 14 at their lower ends and between the brackets 12 by means of the pin 24 at their upper ends. The offset arm 25 of the bell crank is provided with a pin and bushing 26 extending through cam slot 27 in block 28 welded to the top of the ring 4. Secured to the inner edge of the ring 4 are bearing blocks 30 and 31 which are opposed to the blocks 18 and 19 on the mounting plate 15 of the tread sector 10. The brackets 12 support at their lower ends a ring 34 to which is secured a pilot ring 35 having a pilot interior edge 36.

In operation, the bolster 3 descends toward the lower mold section 2 with the upper mold section 1 initially slightly spaced therefrom. Air cylinders or the like, not shown, may be utilized to maintain resiliently the bolster 3 and upper side wall mold section apart. In such spaced apart position, the pin-bushing construction 26 on the offset arm 25 of the bell cranks 22 will be in the lower offset end of the cam slot 27. In such position the tread mold sectors 10 will be radially retracted.

The pilot ring 35 initially engages the lower side wall mold section 2 bringing the upper and lower side wall mold sections into proper concentric registry so that the upper and lower bead rings are concentric. Further lowering of the bolster 3 now closes the space between the bolster and the upper side wall mold section causing the pin-bushing construction 26 to move up the cam slot 27 pivoting the bell cranks 22 in a clockwise direction about the pivot 24 as viewed in FIG. 2 moving the tread sectors inwardly. The outer bearing blocks 30 and 31 now engage the upper pilot edges of the wear plates 20 on the inner bearing blocks 18 and 19 camming the same inwardly to seat the blocks 17 in proper position against the beveled surfaces 38 and 39 of the upper and lower side wall mold sections, respectively.

The ring 4 is preferably stressed to an extent sufficient to create a circumferential centripetal force equal to or greater than the radial forces which will be caused during the high pressure vulcanization of the tire to maintain the tight fit between the tread sectors as well as between the tread sectors and the upper and lower side wall mold sections. When the press is opened the reverse procedure takes place with the tread sectors moving radially outwardly and then the upper and lower side wall mold sections moving apart. In such construction it is apparent that there is substantial wear due to relative movement between the blocks 17 and the upper and lower side wall mold sections as well as substantial compressive force exerted on the blocks 17. Again, reference may be had to aforementioned copending applications for a more complete disclosure of the press construction of the type illustrated in FIGS. 1 and 2.

Referring now additionally to FIG. 3, it will be seen that the block 17 of the tread sector 10 comprises a steel frame portion 40 providing a structural shell and a cast insert portion 41 of a softer metal interfitting with the steel portion 40. The steel frame 40 includes a shelf 42 at the rear thereof as well as tapped apertures 43 to accommodate the mounting plate 15 and fasteners 16 therefor. The steel frame includes four columns 44, 45, 46 and 47 extending the entire vertical height of the block 17 contributing to the structural compressive strength. It will also be noted that when the mounting plate 15 is secured to the back of the block, this also adds to the compressive strength thereof.

The softer metal cast into the frame 40 includes a tread section 49 which extends to a substantial depth along the entire interior surface of the block 17. The upper and lower extremities of the tread portion 49 terminate against inwardly inclined surfaces of the steel frame as indicated at 50 and 51. This provides a slight dovetailing of the cast metal within the steel shell to preclude movement toward the center of the mold or to the left as seen in FIG. 2. The inclined surfaces 50 and 51 intersect with the oppositely inclined upper and lower interior edges of the block 17 seen at 52 and 53 which mate with the annular shoulders 38 and 39 on the upper and lower annular mold sections 1 and 2, respectively.

The steel frame 40 is also provided with three windows or passages 55, 56 and 57 projecting through the top and similar windows projecting through the bottom which are filled with the cast metal 41. The passages providing such windows are flared to provide a dovetailed projection of the cast metal which terminates in the same plane as the exterior of the block. The steel frame 40 also includes three windows 59, 60 and 61 projecting through the rear of the block into which the cast metal is placed. The center window 60 is vertically elongated with respect to the side windows 59 and 61 which are substantially square. Again, the passages forming such windows are flared as indicated at 62 to provide a positive lock for the metal cast into the steel frame 40.

The exposed areas 55, 56 and 57 of the cast metal at the top of the sector block 17 as well as at the bottom facilitate the transfer of heat from the upper and lower mold sections 1 and 2 to the tread area of the mold. The exposed areas of the cast metal at the back of the sector block 17 as indicated at 59, 60 and 61 also facilitate the transfer of heat radially inwardly through the mold to the tread area. This is especially advantageous in a steam dome type of press wherein heating medium is circulated exteriorly of the mold.

In FIG. 4 there is illustrated a further embodiment of the present invention wherein the steel shell 70 of the tread sector is provided with an interior liner or insert 71 of a different type of metal into which the tread pattern 72 is machined. The liner 71 is provided with rearwardly extending projections as indicated at 73 and 74 into which are placed tapped inserts 75 to facilitate the securing of the liner 71 to the shell or skeleton 70 by the fasteners 76. In this manner the liner carrying the tread pattern may readily be removed and replaced.

The advantage of utilizing a composite metal tread sector permits the employment of steel as the skeleton to provide the required compressive strength and wear characteristics while a softer metal may be employed for the cast in place insert as seen in FIGS. 1–3 or the removable liner as seen in FIG. 4 to permit more rapid and easier, more economical machining of the tread pattern.

As the cast in place or removable softer metal liner, aluminum is preferred while 1020 hot rolled steel may be employed for the shell 40 or 70.

The various types of aluminum sand cast alloys can be employed such as 356T6, 355T6, 750T5, 319T6 and 214 (Aluminum Company of America Alloy No.). Of the above-noted alloys, 214 (S.A.E. Alloy No. 320) is preferable providing better soundness, less shrinkage, and having good machinability characteristics. As noted in "The Aluminum Data Book," published by Reynolds Metals Company, 1965, the 214 aluminum alloy has the following mechanical and physical properties.

Tensile:
  Ultimate, p.s.i. _____ 25,000
  Yield, p.s.i. _____ 12,000
Elongation, percent in 2 in. _____ 9.0
Compress yield strength, p.s.i. _____ 12,000
Hardness, Brinell 500 kg. load, 10 mm. ball ____ 50
Shearing strength, p.s.i _____ 20,000
Endurance, limit, p.s.i. _____ 7,000
Mod. of elasticity, p.s.i. _____ $10.3 \times 10^6$
Sp. Gr. _____ 2.65
Wt., lb./cu. in. _____ 0.096
Solidification range, ° F. _____ 1185–1110
Elec. conductivity percent of I.A.C.S. (Int. Annealed Copper Std.) _____ 35
Thermal conductivity at 25° C., c.g.s. units ____ [1] 0.33

Coeff. of thermal expansion:
  68–212 _____ $13.3 \times 10^{-6}$
  68–572 _____ $14.4 \times 10^{-6}$

[1] Steel=0.11. This is equiv. to 79.8 B.t.u./hr. ft.$^2$ ° F./ft.

It is also noted that the 214 aluminum alloy has the following composition limits.

| | Percent by wt. |
|---|---|
| Si | 0.30 |
| Fe | 0.30 |
| Cu | 0.10 |
| Mn | 0.10 |
| Mg | 3.6–4.5 |
| Zn | 0.10 |
| Ti | 0.20 |
| Others: | |
| Each | 0.05 |
| Total | 0.15 |

In casting the aluminum insert 41 into the steel frame 40, it is preferred to preheat the steel frame to a temperature of from about 350° F. to about 1150° F. to obtain better bonding results. It was found that the best bonding results were obtained at about 1150° F. The composite metal segments may preferably be made by placing the steel shells on end and casting by feeding from the bottom up to gate and riser the castings. With the completed block formed, the tread pattern 78 may then readily be machined into the interior exposed portion of the aluminum.

The insert may be removed by melting it out with the frame used again. Alternatively, the pattern may be cut out and the insert rebuilt by the flame spray process to have a new pattern machined therein.

In obtaining such composite mold section, the average gap between the aluminum and steel is approximately .007 inch which would normally have the effect of reducing heat transfer. However, at the elevated temperatures encountered during vulcanization, the gap is minimized to afford good thermal transfer. For example, a gap of .007 inch at 80° F. is reduced to an average of .001 inch at 429° F. Accordingly, excellent contact between the steel and aluminum is obtained providing the desired thermal conductivity.

It can now be seen that there is provided a composite metallic mold section having the proper structural and wear resistance characteristics while also providing for easier and more rapid machining of the pattern.

Other modes of applying the principles of the invention may be employed, change being made as regards the details described, provided the features stated in any of the following claims or the equivalent of such be employed.

I, therefore, particularly point out and distinctly claim as my invention:

1. A tire mold construction for a sectional mold tire press comprising upper and lower side wall mold sections axially movable one relative to the other for opening and closing said side wall mold sections, a plurality of tread mold sectors therebetween, and means mounting said tread mold sectors for radial movement between said side wall mold sections when said side wall mold sections are closed, the tops and bottoms of said tread mold sectors having sliding engagement with said side wall mold sections when closed, each tread mold sector comprising a composite metallic structure having a softer metal insert in a harder metal frame, said softer metal insert having a higher thermal conductivity than said harder metal frame, said softer metal insert having a tire tread pattern on the interior thereof, said frame having passages leading to the radial exterior and top and bottom thereof with the softer metal of the insert substantially filling such passages and terminating in the same plane as the radial exterior, top and bottom of said frame thus facilitating transfer of heat from said side wall mold sections and the exterior of the tread mold sectors when heated to the tread pattern, and the harder metal frame providing the required compressive strength and wear resistance for each of said tread mold sectors.

2. A tire mold construction as set forth in claim 1 wherein said frame has at least two separate passages leading to the top and to the bottom thereof.

3. A tire mold as set forth in claim 1 wherein said softer metal insert is aluminum.

4. A tire mold as set forth in claim 3 wherein said harder metal frame is steel.

5. A tire mold construction as set forth in claim 1 wherein said softer metal insert is an aluminum alloy 214, S.A.E. No. 320, and said harder metal frame is 1020 hot rolled steel.

References Cited

UNITED STATES PATENTS

| | | | |
|---|---|---|---|
| 1,380,919 | 6/1921 | Maier | 18—44 |
| 1,638,023 | 8/1927 | Willshaw | 18—44 |
| 1,899,258 | 2/1933 | Bush | 18—44 |
| 1,943,947 | 1/1934 | Bungay | 18—44 |
| 1,989,646 | 1/1935 | Tuttle | 18—44 |

FOREIGN PATENTS

| | | |
|---|---|---|
| 1,440,604 | 4/1966 | France. |
| 975,644 | 11/1964 | Great Britain. |

J. HOWARD FLINT, Jr., Primary Examiner

U.S. Cl. X.R.

18—38, 44, 47